UNITED STATES PATENT OFFICE.

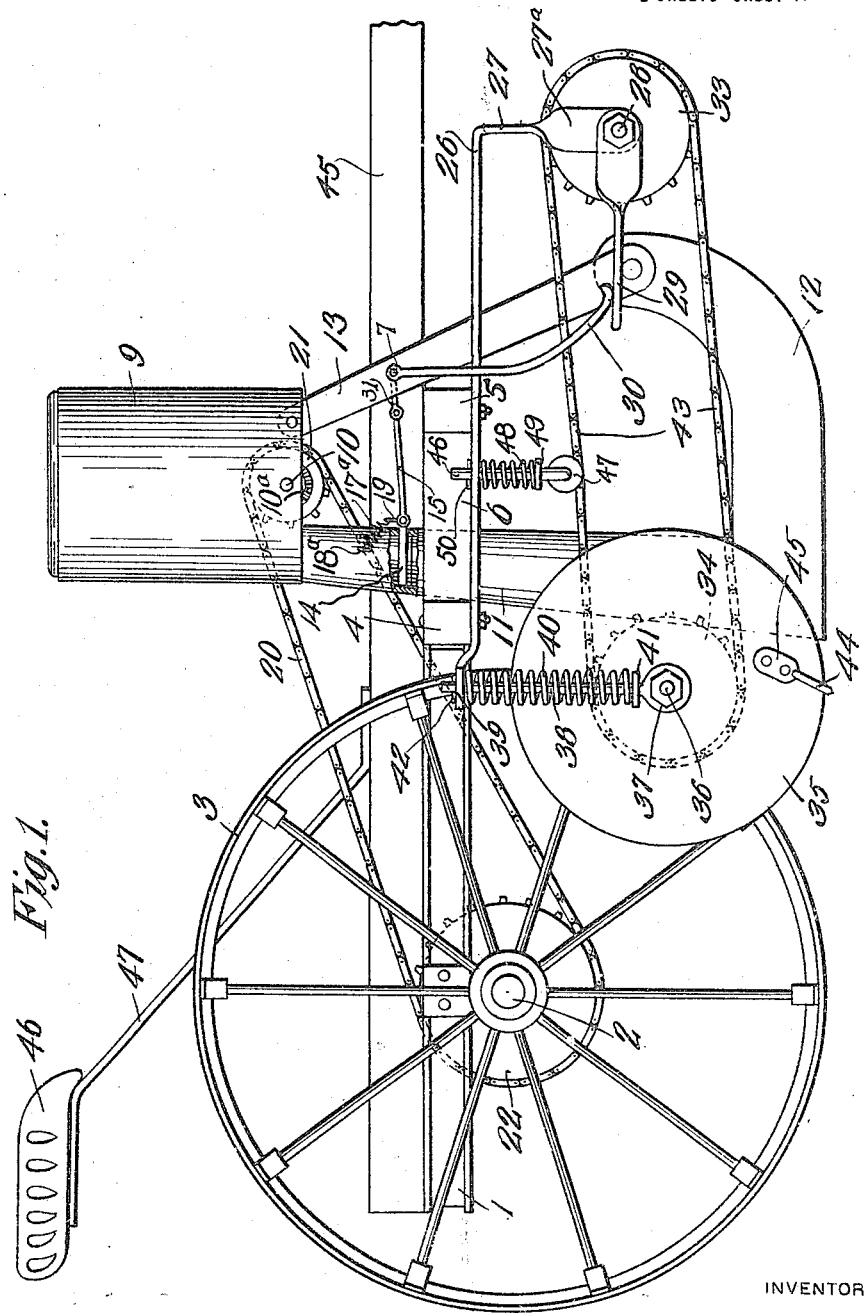

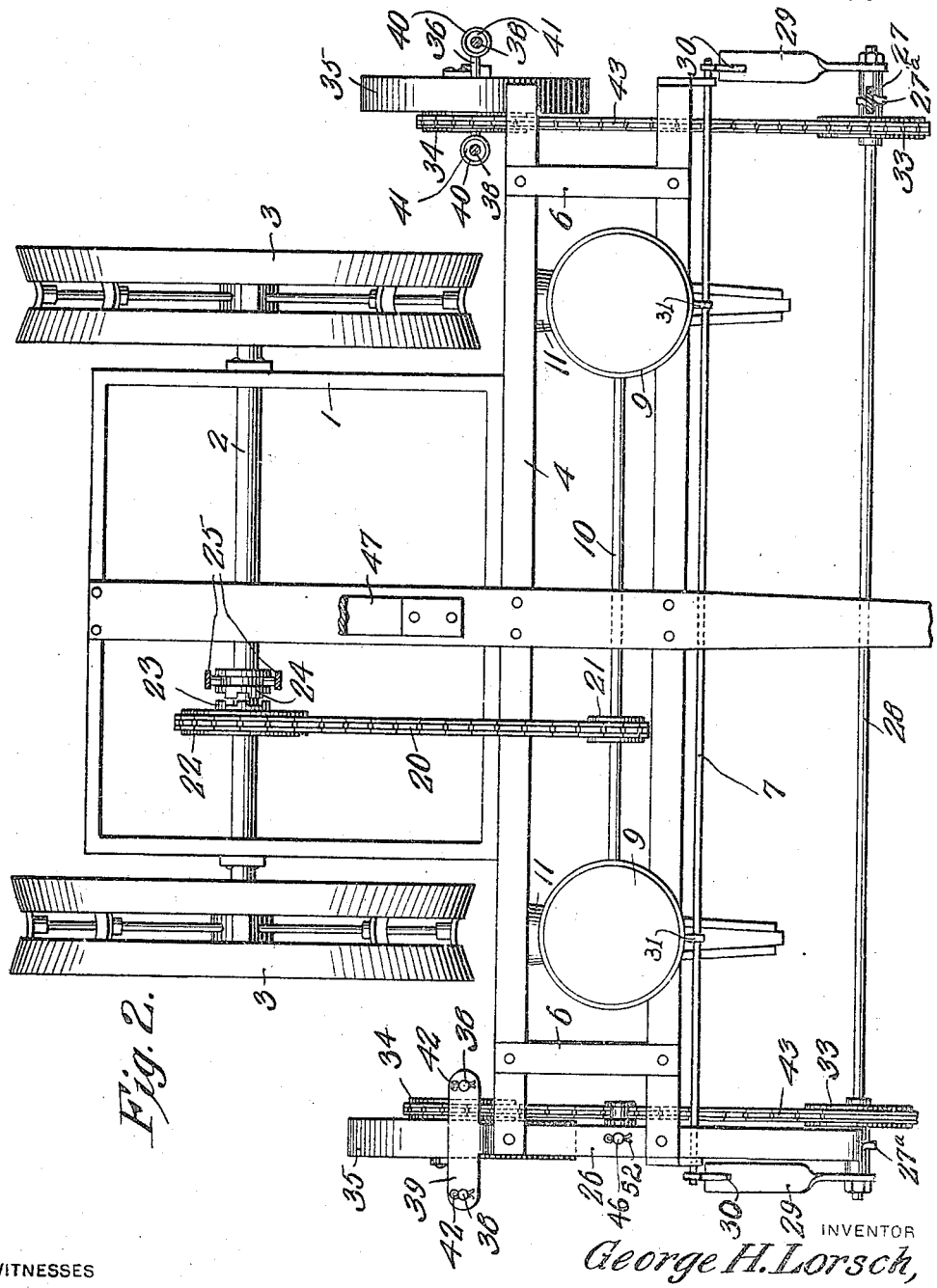

GEORGE H. LORSCH, OF FLORENCE, NEBRASKA.

CORN-PLANTER.

1,229,988.  Specification of Letters Patent.  Patented June 12, 1917.

Application filed November 25, 1916. Serial No. 133,415.

*To all whom it may concern:*

Be it known that I, GEORGE H. LORSCH, a citizen of the United States, residing at Florence, in the county of Douglas and State of Nebraska, have invented certain new and useful Improvements in a Corn-Planter, of which the following is a specification.

This invention relates to corn planters, and more particularly to an attachment for corn planters for checking out hills of corn.

One of the main objects of the invention is to provide an attachment which may be applied to a corn planter of standard construction adapted to replace the usual tripper shaft and forks carried thereby which are normally actuated by a check wire. A further object is to provide an attachment of the character stated of simple construction and operation having marking means whereby the hills of corn may be planted in accurate alinement. A still further object is to provide a simple valve mechanism for depositing the charges of seed, and simple and efficient actuating means therefor. Further objects will appear from the detailed description.

In the drawings:

Figure 1 is a side view of a planter with the attachment applied,

Fig. 2 is a top plan view of the same.

The planter is provided with the rectangular wheel frame 1 of channel construction which is mounted on the axle 2 at each end of which is secured a ground wheel 3. The front bar of frame 1 is secured to a transversely extending frame bar 4. A front frame bar 5 is mounted in spaced relation to, and parallel with, bar 4, these two bars being rigidly connected by the cross beams 6 which are set into the bars 4 and 5, adjacent each end thereof, and secured to the same by suitable bolts or the like. A tongue 45 is secured to the wheel frame 1 and the bars 4 and 5, and supports a seat 46 on a resilient standard 47 secured to the tongue at its lower end. This tongue serves to reinforce the frame elements and to hold the same rigidly in spaced relation.

The bars 4 and 5, and beams 6, constitute a frame near each end of which is supported a seed hopper 9. These hoppers are of usual construction being provided with suitable seeder plates actuated by a rotatable seeder shaft 10 at each end of which is mounted a beveled gear 10ª connected to the seeder plate of the seed hopper so as to actuate the same in the usual manner. Each seed hopper communicates with the seed tube or chute 11 which discharges into the heel of the usual shoe 12 the toe portion of which is braced by the inclined braces 13. A plate valve 14 is slidably mounted in each tube 11, adjacent the upper end thereof, and is pivotally connected by a rod 15 to an arm 31 carried by a shaft 7 rockably mounted in the planter frame. The shaft 7 is normally held rocked inward or rearward of the planter by a tension coil spring 17ª one end of which is secured to a lug 18ª formed on the chute 11 and the other end to an eye 19 secured on the rod 15. By this means the plate valve 14 is normally held in position to close the chute 11 so that, as the seeder shaft 10 is rotated, a charge of seed will accumulate on top of this valve. The seeder shaft 10 is rotated by means of a sprocket chain 20 which is passed about a sprocket 21 secured on the seeder shaft and a sprocket 22 mounted on the axle 2 in alinement with sprocket 21. The sprocket 22 is formed with a clutch member 23 adapted to be engaged by a clutch member 24 which is feathered on axle 2 and moved into and out of operative position by a hand lever 25. When the clutch member 24 is moved into engagement with the clutch member 23 the sprocket 22 will be rotated with the axle 2 so as to cause rotation of the seeder shaft 10.

For the purpose of rocking the shaft 7 so as to discharge the seed from the tube 11, special tripping means are provided. A rectangular bar 26 is secured to the frame bars 4 and 5 at each end thereof. The forward end of this bar 26 is turned downward at right angles to provide a vertical arm 27 the lower portion of which is turned at right angles to provide a flattened supporting member 27ª. The members 27ª rotatably support a shaft 28 at each end of which is secured a tripping arm 29. As the shaft 28 is rotated, by means to be hereinafter described, the tripping arm 29 engages an arm 30 which is secured on the end of shaft 7 having an inwardly extending finger 31. The engagement of tripping arm 29 with arm 30 serves to rock the shaft 7 forward against the tension of spring 17ª so as to rock finger 31 forwardly and downwardly so as to move the valve 14 outward through the seed tube 11 and discharge the hill of seed which has accumulated on top of the valve into the tube and thence into the corn row. By this means, the valve is reciprocated so as to plant the hills of corn at predetermined intervals.

A sprocket wheel 33 is keyed on shaft 28 adjacent each member 27ª. This sprocket wheel is in alinement with a sprocket wheel 34 carried on the inner face of a drive wheel 35 and concentric therewith. The drive wheel 35 is mounted on a shaft 36 which is rotatably supported in disks 37 formed at the lower ends of supporting rods 38 positioned at each side of the wheel 35. The rods 38 are slidably mounted through a head 39 carried by the rectangular bar 26 at the inner end thereof. An expansion coil spring 40 is mounted about each rod 38 and is confined between the head 39 and a collar 41 adjacent the lower end of the rod. This spring acts normally to force the shaft 36, and consequently the drive wheel 35, downward. The downward movement of the rod 38 is positively limited by a cotter pin 42 inserted through the same above head 39. By this means the drive wheel 35 is held downward into tight frictional engagement with the surface of the ground over which the planter is drawn but has sufficient vertical movement to permit it to pass over lumps of earth and other obstructions and irregularities in the ground surface without interfering with the proper operation of the tripping mechanism. The sprocket wheel 34 is connected by a sprocket chain 43 with the sprocket wheel 33 so that, as the planter is drawn across the field, by any suitable traction means, rotation is imparted to sprocket wheel 33 and the shaft 28. The sprocket wheels 34 and 33 are of the same diameter so that the shaft 28 is moved through a complete rotation for every rotation of the drive wheel 35. By this means a hill of corn will be planted for each rotation of the drive wheel so that, by having suitable marking means mounted on the drive wheel, the hills which are planted may be marked thus enabling the corn hills to be planted in accurate alinement. For this purpose a small blade or marker 44, which is provided with an integral flat head 45 is secured to the outer surface of the wheel 35. Each time the wheel makes a complete rotation the blade 44 acts to cut out or mark the surface of the ground. By this means, after one row of corn has been planted, the next row may be planted in proper alinement therewith by bringing the marker 44 into engagement with the last mark of the preceding row, before starting the planting operation. By noting whether or not the marker 44 registers properly with the marks made on the preceding trip across the field the rows of corn may be planted in alinement and also properly spaced. By having the drive wheel 35 of the desired predetermined diameter the distance apart of the hills planted may be adjusted as desired. In practice the disk or wheel 35 will be approximately 13 inches in diameter or about 3½ feet in circumference so that the hills of corn will be planted this distance apart. Of course, if desired, the wheel 35 can be of smaller diameter, thus enabling the corn hills to be planted different distances apart by the simple expedient of placing drive wheels of different diameters upon the axle 36.

A vertical rod 46 is slidably mounted through the bar 26 and is turned inward at right angles, at its lower end, to provide a support for a rotatable grooved wheel 47. The groove of this wheel receives the upper run of sprocket chain 43. Wheel 47 is forced downward by a coil expansion spring 48 mounted about rod 46 and confined between bar 26 and a collar 49 secured on the rod, this downward movement of the rod being positively limited by a cotter pin 50 passed through the rod above bar 26. By this construction I provide simple and efficient means for maintaining the chain 43 at proper working tension.

My attachment may be easily applied to corn planters of standard construction and is especially adapted to replace the usual tripping shaft and forks and checking wire employed in connection with planters of the check-row type.

There may be slight changes made in the construction and arrangement of the different parts of my invention without departing from the field and scope of the same, and I intend to include all such variations, as fall within the scope of the appended claims, in this application in which a preferred form only of my invention is disclosed.

What I claim is:

1. In corn planters, the combination of a seed hopper, a seed discharge tube communicating therewith, a valve slidably mounted in said tube, a rockably mounted tripping shaft, a rod pivotally connected to the valve at one end, a tension spring connected to the rod at one end and to a fixed member at the other end, a depending arm secured on the tripping shaft, a tripping arm secured on said rotatable shaft and adapted to engage the depending arm of the tripping shaft when said rotatable shaft is rotated, a sprocket wheel keyed on the rotatable shaft, a pair of spaced vertically movable bars, expansion springs mounted about said bars and acting to normally hold the same in depressed position, a drive wheel rotatably mounted between said rods, a sprocket wheel carried by said drive wheel and in alinement with the sprocket wheel keyed on the said rotatable shaft, and driving connections between said sprocket wheels.

2. In corn planters, the combination of a seed hopper, a seed discharge tube communicating therewith, a valve slidably mounted in said tube, a rockably mounted tripping shaft, a rod pivotally connected to the valve at one end, a tension spring connected to the valve rod at one end and to a fixed member at the other end, a depending arm secured on the tripping shaft, a shaft rotatably mounted in front of and parallel with the tripping shaft, a tripping arm secured on said rotatable shaft and adapted to engage the depending arm of the tripping shaft when said rotatable shaft is rotated, a sprocket wheel keyed on the rotatable shaft, a pair of spaced vertically movable bars, expansion springs mounted about said bars and acting to normally hold the same in depressed position, a drive wheel rotatably mounted between said rods, a sprocket wheel carried by said drive wheel and in alinement with the sprocket wheel keyed on the said rotatable shaft, driving connections between said sprocket wheels, and a marker carried by said drive wheel.

3. An attachment for corn planters having two spaced bars each provided at one end with a vertical arm and at the other end with a rectangularly disposed head, a shaft rotatably mounted in the said vertical arms, a pair of spaced rods mounted in each of said heads for vertical movement, expansion springs mounted about the said rods and acting to normally hold the same in depressed position, drive wheels rotatably supported by said rods, sprocket wheels keyed on said shaft, and driving connections between the sprocket wheels and the drive wheels for imparting rotation to said shaft when said drive wheels are rotated.

In testimony whereof I affix my signature in presence of two witnesses.

GEORGE H. LORSCH.

Witnesses:
 E. E. RICHARDS,
 GEORGE HELTON.

Copies of this patent may be obtained for five cents each, by addressing the "Commissioner of Patents, Washington, D. C."